US011702235B2

(12) United States Patent
Merrell et al.

(10) Patent No.: US 11,702,235 B2
(45) Date of Patent: *Jul. 18, 2023

(54) ENCAPSULATING PACKAGING CUSHIONS, SYSTEMS AND METHODS, AND METHODS OF MANUFACTURING ENCAPSULATING PACKAGING CUSHIONS

(71) Applicant: EPE Industries USA Inc., Fountain Valley, CA (US)

(72) Inventors: Troy Merrell, Fountain Valley, CA (US); Matt Christy, Fountain Valley, CA (US)

(73) Assignee: EPE Industries USA Inc., Fountain Valley, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/212,096

(22) Filed: Mar. 25, 2021

(65) Prior Publication Data

US 2021/0206522 A1    Jul. 8, 2021

Related U.S. Application Data

(63) Continuation of application No. 15/631,025, filed on Jun. 23, 2017, now Pat. No. 10,960,996.

(Continued)

(51) Int. Cl.
*B65D 81/05* (2006.01)
*B65B 5/04* (2006.01)
(Continued)

(52) U.S. Cl.
CPC ............... *B65B 5/04* (2013.01); *B29C 44/58* (2013.01); *B65B 55/20* (2013.01); *B65D 81/05* (2013.01);

(Continued)

(58) Field of Classification Search
CPC ...... B65D 81/113; B65D 81/00; B65D 81/02; B65D 81/022; B65D 81/05; B65D 81/107;
(Continued)

(56) References Cited

U.S. PATENT DOCUMENTS 4,032,006 A   6/1977   Cantarella et al.
4,620,633 A   11/1986  Lookholder
(Continued)

FOREIGN PATENT DOCUMENTS

WO   WO 2014/137267 A1   9/2014

*Primary Examiner* — Robert Poon
(74) *Attorney, Agent, or Firm* — Eric L. Lane; Green Patent Law

(57) ABSTRACT

A packaging cushion is provided which has a bottom cushion piece, first and second side cushion pieces, a front cushion piece, a rear cushion piece, and a translated top cushion piece. The bottom cushion piece defines a void cavity and front entry portion. The first side cushion piece may be substantially perpendicular to the bottom cushion piece, and the second side cushion piece may be substantially perpendicular to the bottom cushion piece and opposite the first side cushion piece. The front cushion piece may be substantially perpendicular to the bottom cushion piece and may define an entry space adjacent to the front entry portion. The rear cushion piece may be substantially perpendicular to the bottom cushion piece and opposite the front cushion piece. The translated top cushion piece extends from the rear cushion piece and is displaced from the void cavity. The packaging cushion at least partially covers six sides of a product housed therein. Methods of packaging products and methods of manufacturing a one-piece encapsulating packaging cushion using a male mold and a female mold are also provided.

10 Claims, 12 Drawing Sheets

Related U.S. Application Data

(60) Provisional application No. 62/510,523, filed on May 24, 2017.

(51) Int. Cl.
  *B65B 55/20* (2006.01)
  *B65D 85/30* (2006.01)
  *B65D 81/113* (2006.01)
  *B29C 44/58* (2006.01)
  *B29K 23/00* (2006.01)

(52) U.S. Cl.
  CPC ............ *B65D 81/113* (2013.01); *B65D 85/30* (2013.01); *B29K 2023/06* (2013.01); *B29K 2023/12* (2013.01)

(58) Field of Classification Search
  CPC .. B65D 81/1075; B65D 85/30; B65D 81/058; B65D 81/057; B65D 81/056; B65D 81/133; A45C 2011/002
  USPC ....... 206/523, 587, 588, 592, 564, 563, 521, 206/320
  See application file for complete search history.

(56) References Cited

U.S. PATENT DOCUMENTS

| | | | |
|---|---|---|---|
| 4,925,149 A | | 5/1990 | DiFrancesca |
| 5,360,108 A | * | 11/1994 | Alagia ................. H01H 9/0242 |
| | | | 206/320 |
| 5,368,159 A | | 11/1994 | Doria |
| 6,298,989 B1 | * | 10/2001 | Chu ........................ B65D 85/30 |
| | | | 206/592 |
| 7,398,884 B2 | * | 7/2008 | Stegner ................ B65D 81/107 |
| | | | 53/472 |
| 7,475,816 B1 | * | 1/2009 | Rochelo ................. A45C 11/18 |
| | | | 235/487 |
| 7,494,013 B2 | | 2/2009 | Kao |
| 10,960,996 B2 | * | 3/2021 | Merrell ..................... B65B 5/04 |
| 2002/0117243 A1 | * | 8/2002 | Koren ................ G06F 3/04817 |
| | | | 150/147 |
| 2003/0034273 A1 | | 2/2003 | Auclair |
| 2005/0092645 A1 | | 5/2005 | Arnold |
| 2006/0084191 A1 | | 4/2006 | Hwan |
| 2006/0108255 A1 | * | 5/2006 | Chu ........................ B65D 81/025 |
| | | | 206/592 |
| 2008/0105592 A1 | * | 5/2008 | Cheng ................... B65D 81/058 |
| | | | 206/591 |
| 2011/0192751 A1 | | 8/2011 | Doster |
| 2015/0107080 A1 | | 4/2015 | Chen et al. |
| 2015/0264822 A1 | | 9/2015 | Poon |

* cited by examiner

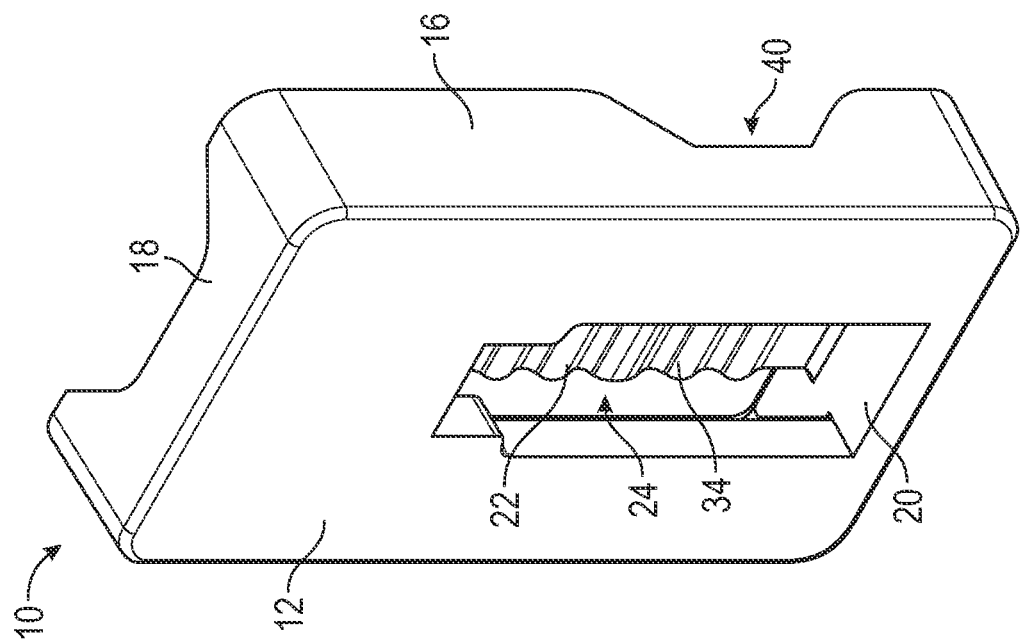
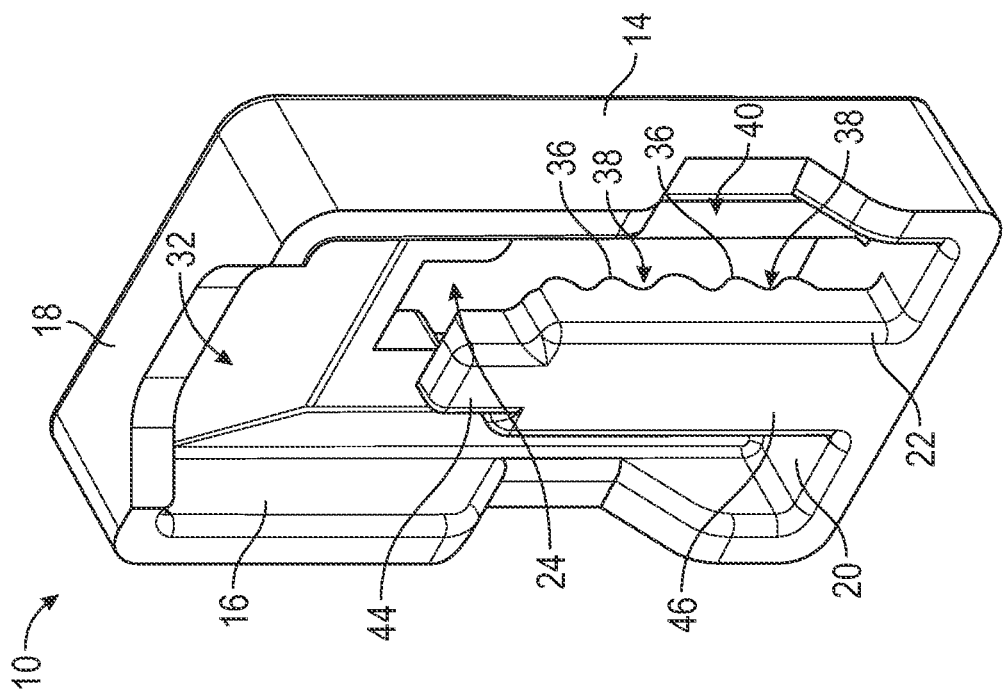

ENCAPSULATING PACKAGING CUSHIONS, SYSTEMS AND METHODS, AND METHODS OF MANUFACTURING ENCAPSULATING PACKAGING CUSHIONS

CROSS-REFERENCE TO RELATED APPLICATIONS

This application is a continuation of U.S. patent application Ser. No. 15/631,025, filed Jun. 23, 2017, issued as U.S. Pat. No. 10,960,996 on Mar. 30, 2021, which is a non-provisional of and claims priority to and benefit of U.S. Patent Application No. 62/510,523, filed May 24, 2017, each of which is hereby incorporated by reference in its entirety.

FIELD

The present disclosure relates to packaging cushions and packaging systems, methods of packaging and shipping, and methods of manufacturing packaging cushions.

BACKGROUND

Cushioning devices for product packaging and shipping are increasingly needed as global trade continues to expand. As more complicated and expensive electronic devices are shipped around the world, there is a need for more sophisticated and more effective shock absorbing cushioning devices to protect these products during shipping. But existing packaging systems that seek to provide more sophisticated solutions typically come at the cost of requiring a multi-step packing process for transitional packaging.

Some known packaging materials and devices include bubble wrap, air bags, honeycomb cardboard, and polystyrene (styrofoam peanuts). Some of these materials are heavy and therefore increase shipping and fuel costs. Other known packaging materials, such as polystyrene blocks or molded plastics, are designed and manufactured specifically for particular products. However, this can be wasteful and unduly expensive as different specialty materials need to be made for a large variety of different products and cannot typically be re-used. Other materials such as air bags and bubble wrap often get destroyed in shipping and cannot be re-used. Furthermore, many of the plastics and polystyrene materials are not recyclable or biodegradable.

Many sophisticated electronics devices are fragile and need to be protected from impact during shipping. Existing solutions to address product fragility during shipping include two-piece packaging cushions. One disadvantage of most two-piece cushions is that they do not protect the electronic device on all sides. Other packaging solutions, such as cardboard or plastic-based materials, do not provide cushioning on all sides of the electronic device. Packaging solutions such as end caps and top and bottom caps made of foam are inefficient and waste materials as they require the use of a complete end cap, or a complete top and bottom tray of foam regardless of the amount of foam actually required to protect the product during transit. This results in increased material costs, increased labor costs, and a significant increase in environmental waste.

Accordingly, there is a need for a packaging cushion that protects all sides of electronic devices and similar products. There also is a need for a packaging cushion that is relatively cheap, easily manufactured and scalable. There is a need for a packaging cushion that effectively and efficiently addresses product fragility. There is also a need for a packaging system that can hold several differently sized products.

SUMMARY

Embodiments of the present disclosure alleviate to a great extent the disadvantages of known packaging systems and methods by providing a one-piece packaging cushion that fully or partially encapsulates all sides of a product utilizing a void cavity and its translated surface to provide protection on the opposite surface. In exemplary embodiments, the translated surface provides compression against the product utilizing a variable compression top cushion to securely hold varied depth products within. The translated surface can be any shape and any size. The packaging cushion can be made of any moldable foam material, such as molded polyethylene or polypropylene.

Disclosed embodiments improve the protection of products such as, but not limited to, electronic devices, including smartphones and other mobile phones, tablets, e-readers and the like. The universality provided by the variable compression top cushion allows for it to act as a universal packaging solution holding several differently sized products. Instead of a two-piece packaging cushion, exemplary embodiments protect products on all sides (typically six sides for a smartphone or tablet) without using more material and without the additional expenses in manufacturing of having two molds or a multi-step manufacturing process of bonding one cushion to another.

Exemplary embodiments of a packaging cushion have a bottom cushion piece, first and second side cushion pieces, a front cushion piece, a rear cushion piece, and one or more translated top cushion pieces. The bottom cushion piece defines a void cavity and an entry portion. The first side cushion piece may be perpendicular to the bottom cushion piece, and the second side cushion piece may be perpendicular to the bottom cushion piece and opposite the first side cushion piece. The front cushion piece may be perpendicular to the bottom cushion piece and define an entry space adjacent to the entry portion. The rear cushion piece may be perpendicular to the bottom cushion piece and opposite the front cushion piece. The translated top cushion piece extends from the rear cushion piece and can be parallel to or at any angle to and displaced from the void cavity. In exemplary embodiments, the size and shape of the void cavity corresponds to the size and shape of the translated top cushion piece.

In exemplary embodiments, the packaging cushion at least partially covers six sides of a product housed therein. The translated top cushion piece may define a void space. The translated top cushion piece may comprise a variable compression contact surface. In exemplary embodiments, at least part of one or more of the bottom cushion piece, the translated top cushion piece, and the rear cushion piece is made of a variable compression material. One or both of the first and second side cushion pieces may define an access space, and the bottom cushion piece may define one or more access spaces. In exemplary embodiments, one or both of the first and second side cushion pieces defines one or more grooves.

Exemplary embodiments include methods of packaging a product for shipping. Exemplary methods include the step of inserting a product into a packaging cushion by sliding the product through an entry space in a front cushion piece and over an entry portion of a bottom cushion piece. Exemplary packaging methods further include disposing the product in the packaging cushion such that the product rests on the bottom cushion piece, substantially covers a void cavity defined in the bottom cushion piece, and is cabined in by a rear cushion piece perpendicular to the bottom cushion piece and opposite the front cushion piece. In exemplary embodiments, a first side cushion piece is perpendicular to the bottom cushion piece, and a second side cushion piece is perpendicular to the bottom cushion piece and opposite the first side cushion piece. Exemplary methods include the step of securing the product in the packaging cushion by providing compression on the product from a translated top cushion piece extending from the rear cushion piece parallel to and displaced from the void cavity.

In exemplary embodiments, the securing step comprises providing compression from a variable compression contact surface of the translated top cushion piece. The securing step may further comprise providing compression from a variable compression material in at least part of one or more of the group consisting of the bottom cushion piece, the translated top cushion piece, and the rear cushion piece. In exemplary embodiments, the product comprises six sides and the disposing step results in each of the six sides being at least partially covered by the packaging cushion. Exemplary methods further comprise removing the product from the packaging cushion by sliding it out over the front entry portion and through the entry space.

Methods of manufacturing a one-piece encapsulating packaging cushion using a male mold and a female mold are also disclosed. Exemplary manufacturing methods comprise forming a void cavity in a bottom cushion piece and forming a translated top cushion piece parallel to or at any angle to and displaced from the void cavity using a male mold having a raised central surface and a female mold having two spaced raised lateral surfaces. Exemplary methods further comprise forming a first side cushion piece perpendicular to the bottom cushion piece and a second side cushion piece perpendicular to the bottom cushion piece and opposite the first side cushion piece using the male mold and the female mold. Exemplary methods also include forming a front cushion piece substantially perpendicular to the bottom cushion piece using the male mold and the female mold. Exemplary manufacturing methods comprise forming a rear cushion piece substantially perpendicular to the bottom cushion piece and opposite the front cushion piece using the male mold and the female mold. In exemplary embodiments, the packaging cushion is made so the translated top cushion piece extends from the rear cushion piece.

In exemplary embodiments, the step of forming the void cavity and the translated top cushion piece comprises raising the male mold into an inner depth of the female mold. In exemplary embodiments, the step of forming the void cavity and the translated top cushion piece comprises raising the female mold into an inner depth of the male mold. Manufacturing methods may further comprise forming a front entry portion in the bottom cushion piece and an entry space in the front cushion piece adjacent to the front entry portion. In exemplary embodiments, the packaging cushion is made of a moldable foam material. Exemplary manufacturing methods further comprise creating a variable compression contact surface on the translated top cushion piece.

Accordingly, it is seen that packaging cushions, packaging methods, and methods of manufacturing packaging cushions are provided which provide improved protection for electronic devices by fully or partially encapsulating all sides of a device utilizing a void cavity and its translated surface to provide protection on the opposite surface. Exemplary embodiments securely hold varied depth products in the packaging cushion. Methods of manufacturing packaging cushions without using more material and without the additional expenses in manufacturing of having two molds or a multi-step manufacturing process of bonding one cushion to another are provided. These and other features and advantages will be appreciated from review of the following detailed description, along with the accompanying figures in which like reference numbers refer to like parts throughout.

BRIEF DESCRIPTION OF THE DRAWINGS

The foregoing and other objects of the disclosure will be apparent upon consideration of the following detailed description, taken in conjunction with the accompanying drawings, in which:

FIG. 2A is a front perspective view of the packaging cushion of FIG. 1;

FIG. 2B is a rear perspective view of the packaging cushion of FIG. 1;

DETAILED DESCRIPTION

Figure 1:
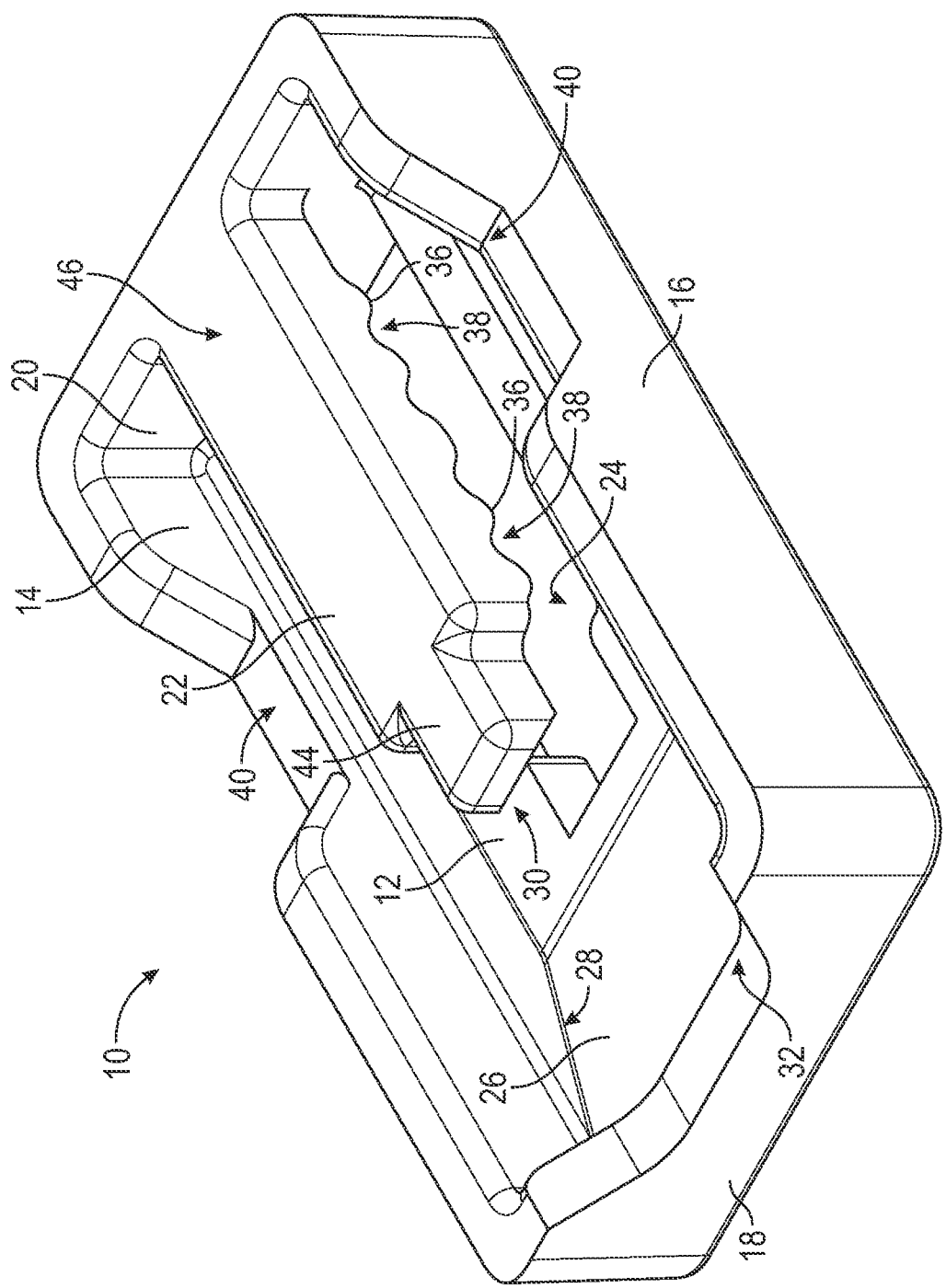
FIG. 1 is a perspective view of an exemplary embodiment of a packaging cushion in accordance with the present disclosure.

In the following paragraphs, embodiments will be described in detail by way of example with reference to the accompanying drawings, which are not drawn to scale, and the illustrated components are not necessarily drawn proportionately to one another. Throughout this description, the embodiments and examples shown should be considered as exemplars, rather than as limitations of the present disclosure. As used herein, the "present disclosure" refers to any one of the embodiments described herein, and any equivalents. Furthermore, reference to various aspects of the disclosure throughout this document does not mean that all claimed embodiments or methods must include the referenced aspects.

Referring to FIGS. 1-4, an exemplary embodiment of a packaging cushion will be described. An exemplary packaging cushion 10 is a unitary, one-piece cushion with several wholly integrated features. For purposes of description and illustration, some of the parts will be referred to as pieces herein. However, it should be understood that they are not separate pieces, but rather integrated features of a unitary, one-piece packaging cushion.

Packaging cushion 10 comprises a bottom cushion piece 12, first and second side cushion pieces 14, 16, a front cushion piece 18, a rear cushion piece 20, and a translated top cushion piece 22. In exemplary embodiments, the first side cushion piece 14, the second side cushion piece 16, the front cushion piece 18, and a rear cushion piece 20 are each substantially perpendicular to the bottom cushion piece 12 so the packaging cushion 10 forms a semi-contained storage space to at least partially encapsulate the electronic device or other product being shipped. However, the first side cushion piece 14, the second side cushion piece 16, the front cushion piece 18, and the rear cushion piece 20 need not be perpendicular to the bottom cushion piece 12, and could be at any angle in relation to the bottom cushion piece 12 so long as the packaging cushion 10 forms a semi-contained storage space to at least partially encapsulate the electronic device or other product being shipped. Also for purposes of encapsulating the device, the first and second side cushion pieces 14, 16 are located opposite each other at the two lateral sides of the packaging cushion 10. Similarly, the front and rear cushion pieces 18, 20 are opposite each other, with the front cushion piece 18 located at the front end of the packaging cushion 10 and the rear cushion piece 20 at the rear end of the packaging cushion 10.

In exemplary embodiments, there is a void cavity 24 in the bottom cushion piece 12. This feature advantageously reduces the amount of material needed to make the protective packaging cushion. In exemplary embodiments, the translated top cushion piece 22 extends from the rear cushion piece 20 into the interior of the packaging cushion 10. More particularly, the translated top cushion piece 22 may be displaced from the void cavity 24 and from the bottom cushion piece 12 and extend parallel to the void cavity 24 and the bottom cushion piece 12. It should be noted that the translated top cushion piece 22 can be substantially parallel to the void cavity 24 or could be disposed at any angle from the void cavity 24. The translated top cushion piece 22 provides the product cushioning protection against shock and serves to keep the product in place within the packaging cushion 10.

Figure 4:
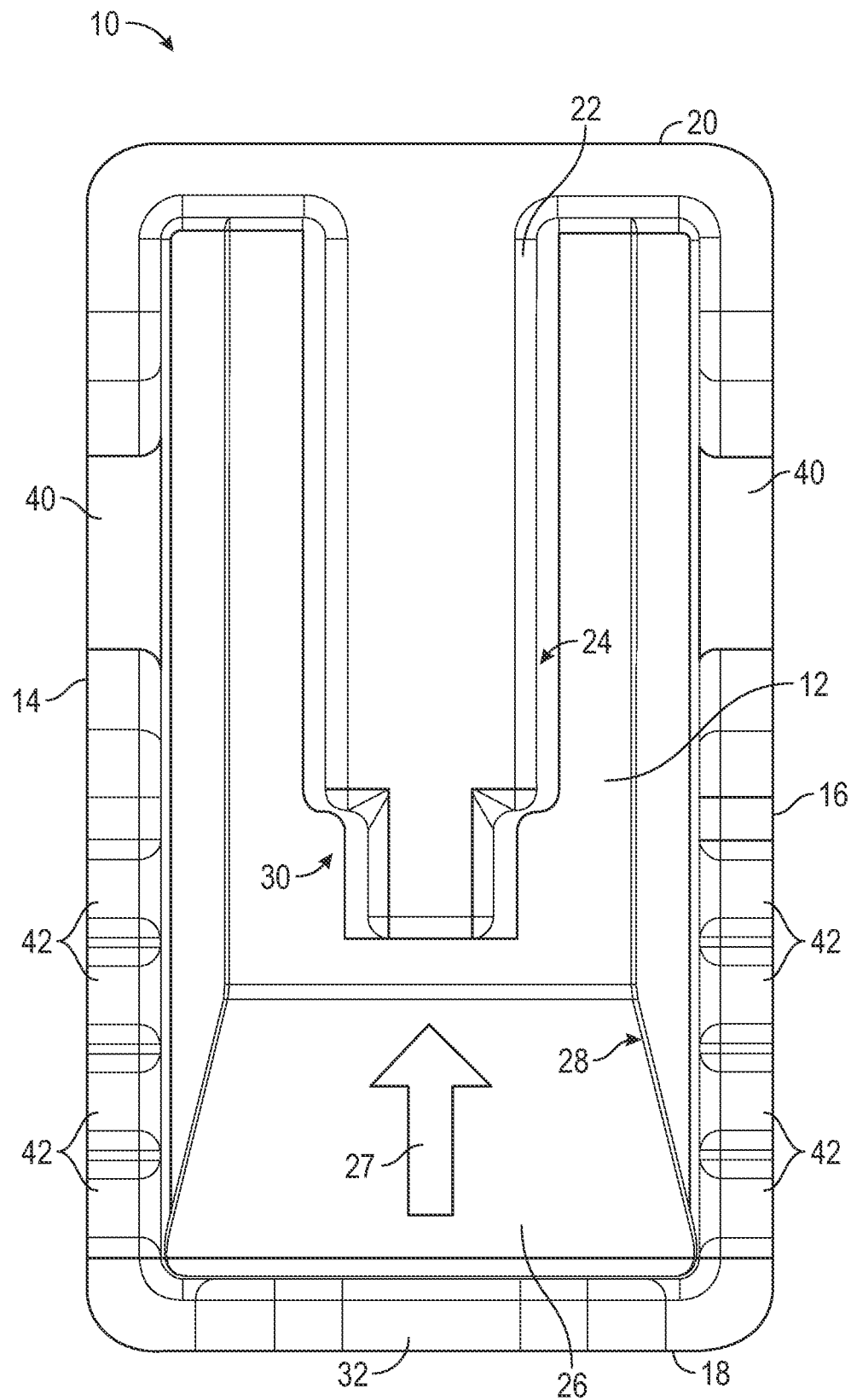
FIG. 4 is a top view of the packaging cushion of FIG. 3.

As best seen in FIG. 4, in exemplary embodiments the translated top cushion piece 22 and the void cavity 24 are of a corresponding size and shape. The translated top cushion piece and void cavity may vary in size and shape to best suit the product being shipped, and can be any shape and size. As discussed in more detail herein, the translated top cushion piece may have a void space. In exemplary embodiments, the translated top cushion piece 22 and void cavity 24 are substantially rectangular in shape and have rectangle portion 46 and a narrower extension portion 44 at the end of the rectangle portion. This structure provides the advantage of effectively securing an electronic device with slightly less cushion material used for the extension portion 44. As discussed in more detail herein, when the size and shape of the void cavity corresponds to the size and shape of the translated top cushion piece the manufacturing process is simplified.

Figure 3:
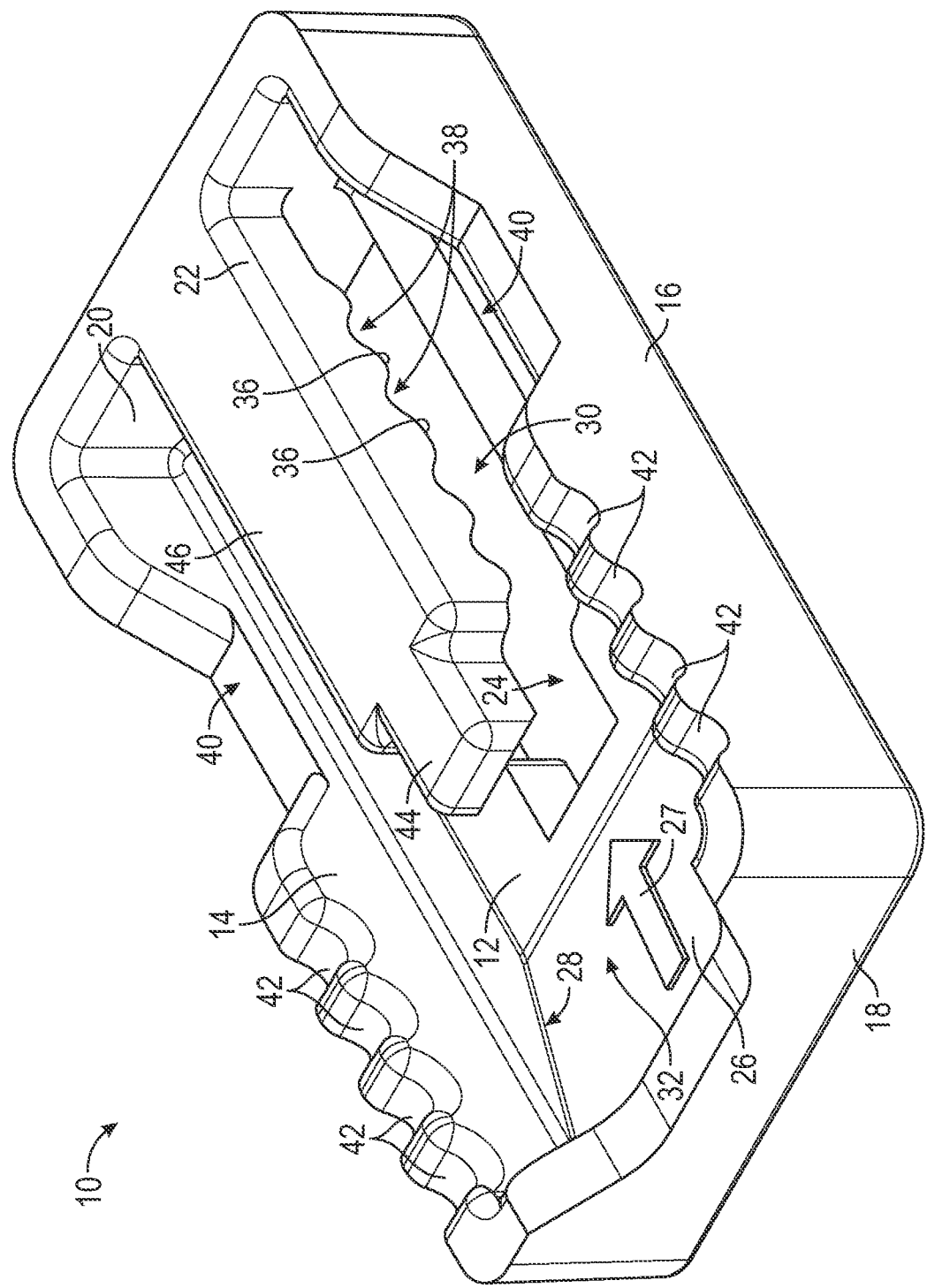
FIG. 3 is a perspective view of an exemplary embodiment of a packaging cushion in accordance with the present disclosure.

Advantageously, exemplary packaging cushions disclosed herein are one-piece cushions that at least partially cover six sides of an electronic device or other product housed and shipped therein. As best seen in FIGS. 1 and 3, the bottom cushion piece 12 may have an entry portion 26. In exemplary embodiments, the entry portion 26 is an angled surface 28 to facilitate sliding entry of the electronic device into the storage space 30 of the packaging cushion 10. As shown in FIG. 3, an arrow 27 may be provided to show the user the direction of entry of the electronic device to be shipped. The front cushion piece 18 may have an entry space 32 defined or cut in it adjacent to the entry portion 26 of the bottom cushion piece 12. As described in more detail herein, the entry path of the product to be shipped would be placed through the entry space 32, over the entry portion 26, and into the storage space 30 such that the product rests on the bottom cushion piece 12 and covers the void space 24.

As mentioned above, the packaging cushion encapsulates the product by at least partially covering its six sides. More particularly, the back surface of the electronic device or other product is at least partially covered by the bottom cushion piece 12, the two lateral sides of the electronic device are at least partially covered by the first and second side cushion pieces 14, 16, respectively, the top and bottom ends of the electronic device are at least partially covered by the rear cushion piece 20 and front cushion piece 18, respectively, and the front surface of the electronic device is at least partially covered by the translated top cushion piece 22. This encapsulation advantageously encapsulates the product being shipped on all sides, providing cushioning for every side of the product and therefore more effective protection for the product. The bottom cushion piece 12 holds the bottom of the product while the translated top cushion piece 22 provides protection on the top of the product.

Figure 7A:
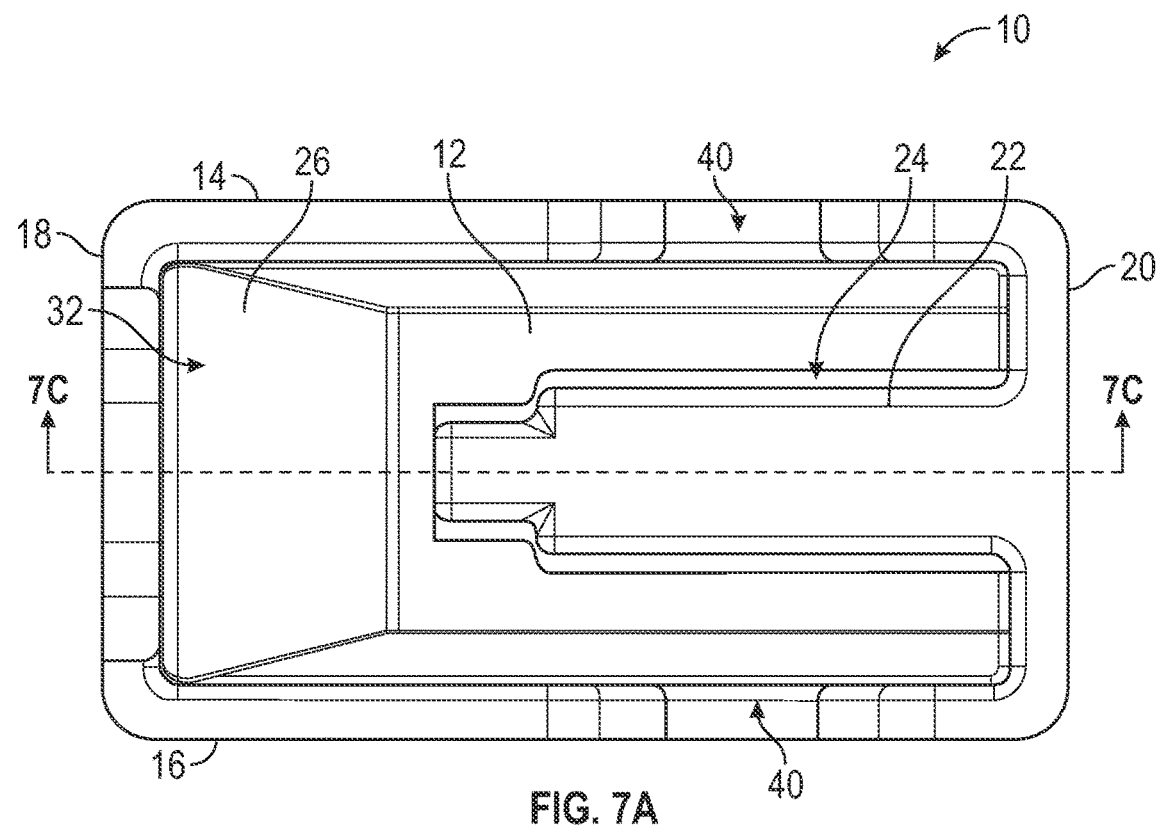
FIG. 7A is a top view of an exemplary embodiment of a packaging cushion in accordance with the present disclosure.
Figure 7B:
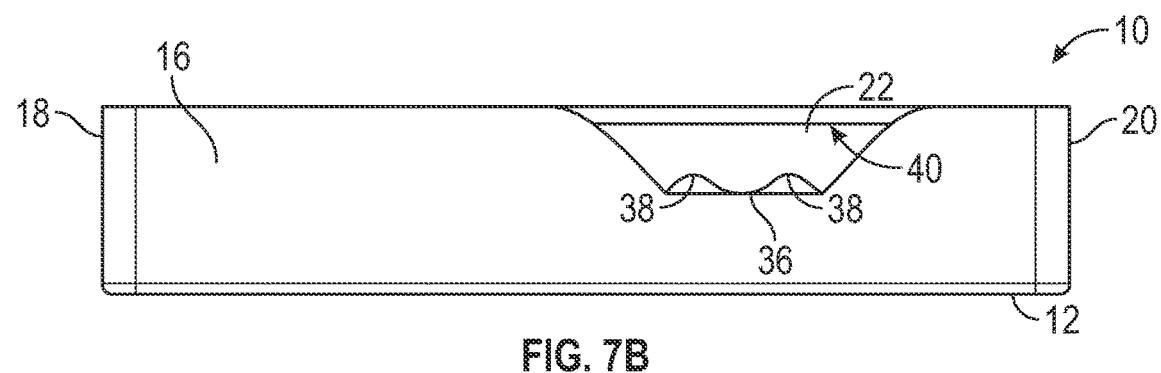
FIG. 7B is a side view of the packaging cushion of FIG. 7A.
Figure 7C:
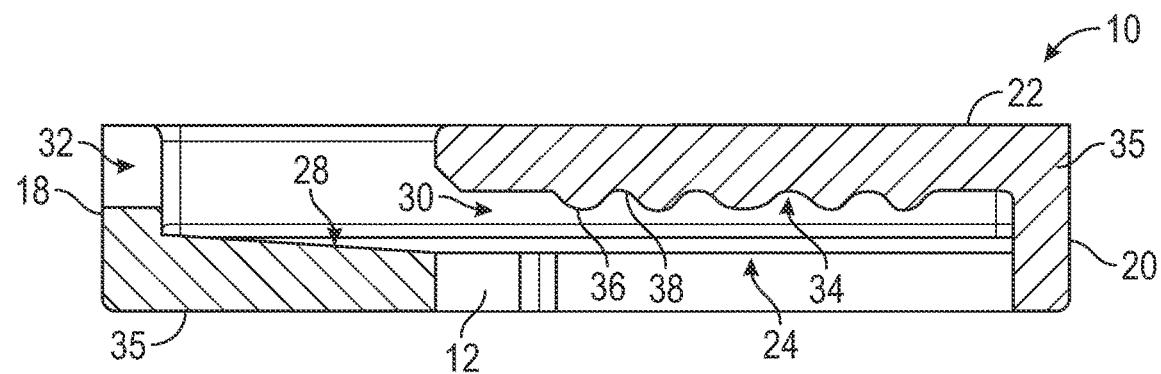
FIG. 7C is a side cross-sectional view of the packaging cushion of FIG. 7A.

In exemplary embodiments, the translated top cushion piece 22 comprises a variable compression contact surface 34, which can compress to secure products with different thicknesses. More particularly, the underside or contact surface 34 of the translated top cushion piece 22 may be made of a variable compression material 35. The contact surface 34 may include one or more crests 36 and troughs 38. Advantageously, the crests 36 of the variable compression contact surface 34 can compress to be even with the troughs 38 when holding thicker products. The variable compression surface is not limited to only the contact surface 34 of the translated top cushion piece 22; it can also be utilized on the bottom cushion piece 12 and other cushion pieces of the packaging cushion 10. In exemplary embodiments, at least part of the bottom cushion piece 12, the translated top cushion piece 22, the front cushion piece 18, the rear cushion piece 20, and/or the first and second side cushion pieces 14, 16 is made of a variable compression material. As best seen in FIG. 7C, an exemplary embodiment is illustrated in which the hatched areas show the variable compression material used in at least part of the bottom cushion piece 12, the translated top cushion piece 22, the front cushion piece 18, and the rear cushion 20 piece.

In exemplary embodiments, the first side cushion piece 14 and/or the second side cushion piece 16 defines an access space 40. Access spaces 40 facilitate insertion of the electronic device into the packaging cushion 10 and removal from the packaging cushion 10. More particularly, the access spaces 40 provide the user with easy access to grasp the sides of the device to either guide it into the packaging cushion 10 before shipping or pull it out of the packaging cushion 10 after shipping. As best seen in FIG. 3, the first side cushion piece 14 and/or the second side cushion piece 16 may define one or more grooves 42 to reduce the amount of material needed to manufacture the packaging cushion 10.

Figure 5A:
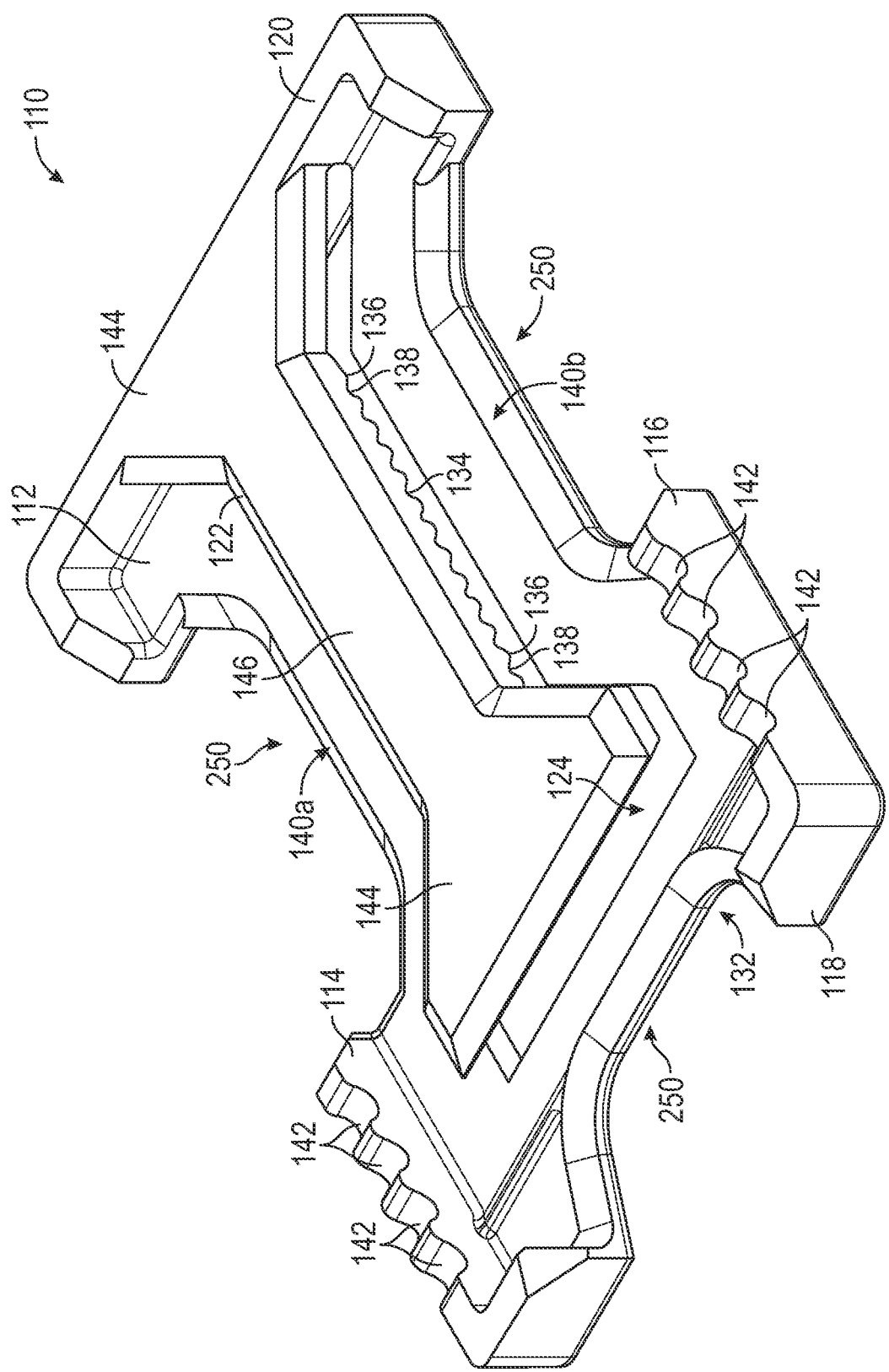
FIG. 5A is a perspective view of an exemplary embodiment of a packaging cushion in accordance with the present disclosure.
Figure 5B:
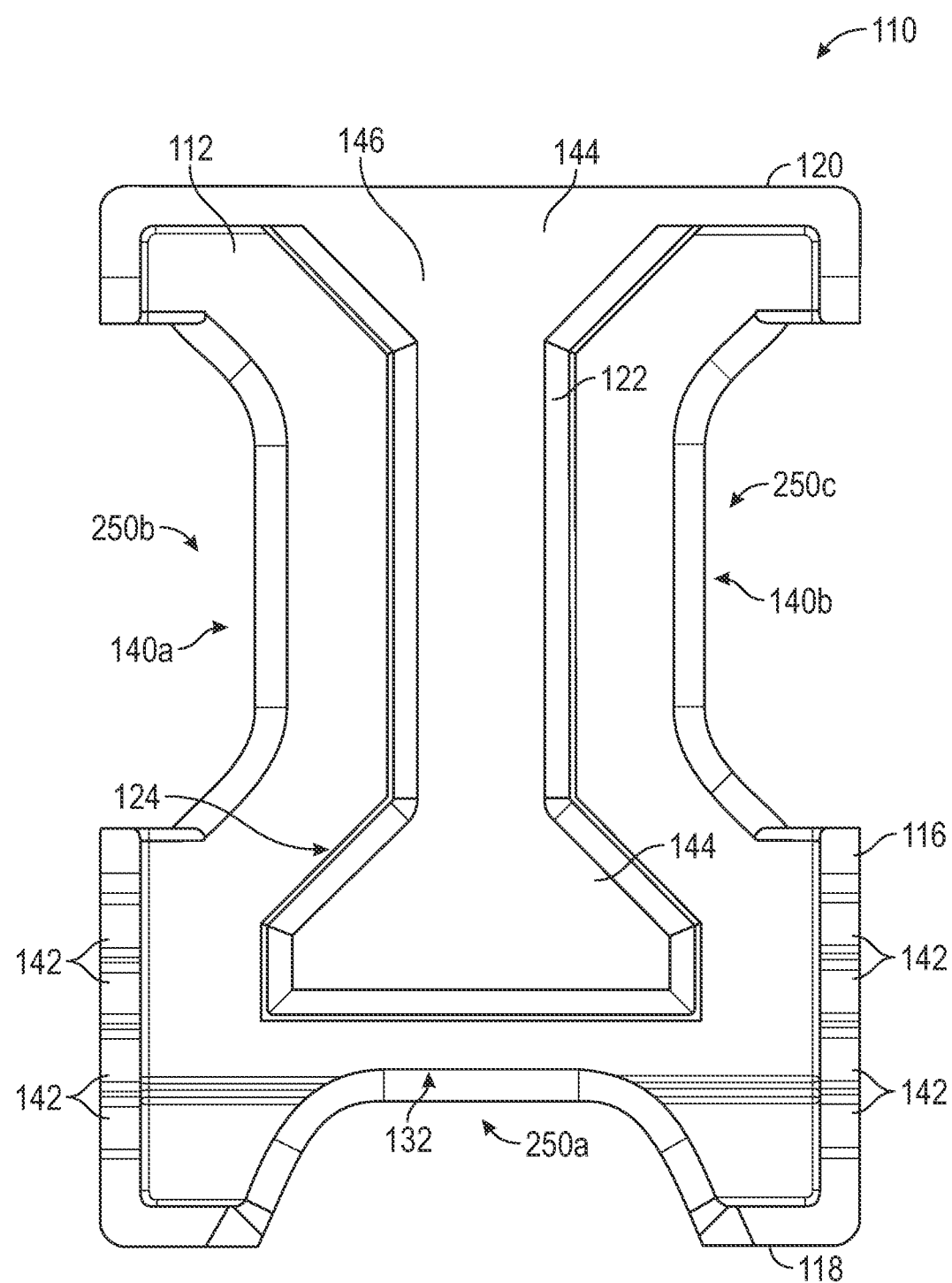
FIG. 5B is a top view of the packaging cushion of FIG. 5A.
Figure 6A:
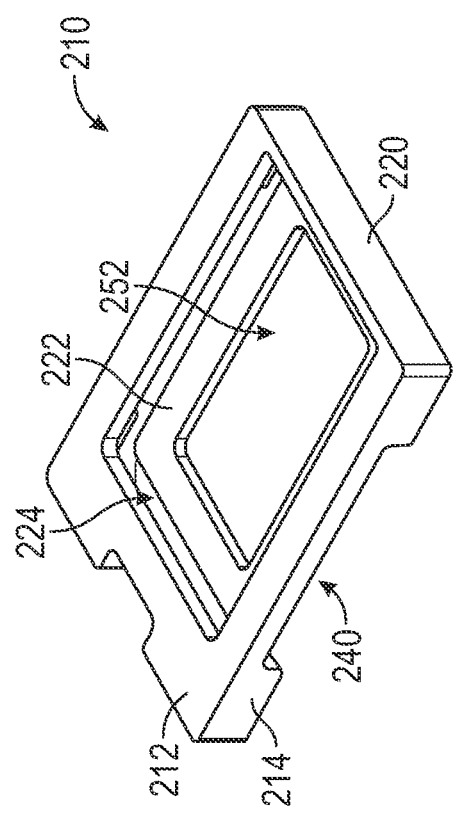
FIG. 6A is a perspective view of an exemplary embodiment of a packaging cushion in accordance with the present disclosure.
Figure 6D:
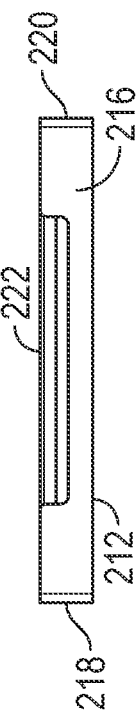
FIG. 6D is a side view of the packaging cushion of FIG. 6A.
Figure 6B:
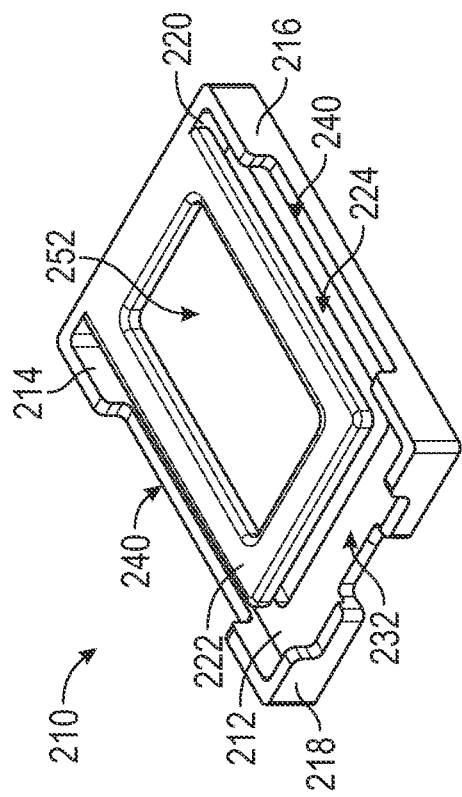
FIG. 6B is a bottom perspective view of the packaging cushion of FIG. 6A.
Figure 6C:
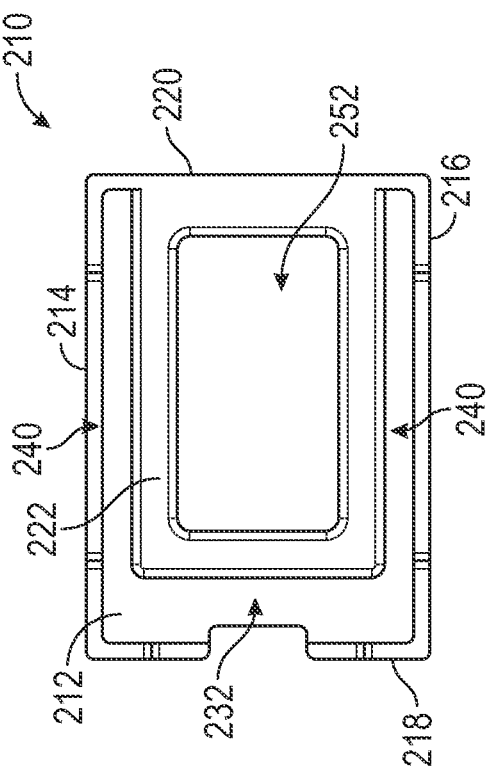
FIG. 6C is a top view of the packaging cushion of FIG. 6A.

With reference to FIGS. 5A and 5B, it can be seen that embodiments are scalable and can be sized for various products. In exemplary embodiments, packaging cushion 110 is sized for tablets or other electronic devices larger than typical mobile phones. Packaging cushion 110 comprises a bottom cushion piece 112 defining a void cavity 124, first and second side cushion pieces 114, 116, a front cushion piece 118, a rear cushion piece 120, and a translated top cushion piece 122. The translated top cushion piece 122 extends from the rear cushion piece 120 into the interior of the packaging cushion 110 such that it is displaced from the void cavity 124 and from the bottom cushion piece 112 and may extends parallel to, or at any other angle to, the void cavity 124 and the bottom cushion piece 112.

The bottom cushion piece 112 defines a void cavity 124 that may correspond in size and shape to the size and shape of the translated top cushion piece 122. The void cavity 124 is formed as part of the molding process where this void cavity is a result of the translated surface or top cushion. As best seen in FIG. 5B, the void cavity 124 and translated top cushion piece 122 may be of a shape that is advantageous for protecting a tablet or other similarly-sized electronic device while using less packaging material. In exemplary embodiments, the void cavity 124 and translated top cushion piece 122 have a substantially triangular portion 144 at each end and a relatively narrow intermediate portion 146. The contact surface 134 of the translated top cushion piece 122 may be made of a variable compression material and may include one or more crests 136 and troughs 138. The other cushion pieces may also be made of a variable compression material.

The front cushion piece 118 may have an entry space 132, and the first side cushion piece 114 and/or the second side cushion piece 116 may define access spaces 140a, 140b, respectively. In exemplary embodiments, there are three bottom access spaces 250 in the bottom cushion piece 112, in particular a front access space 250a which is joined with the entry space 132, a first lateral access space 250b joined with access space 140a, and a second lateral access space 250c joined with access space 140b to facilitate insertion of the electronic device into the packaging cushion 110 and removal from the packaging cushion 110. The first side cushion piece 114 and/or the second side cushion piece 116 may define one or more grooves 142 to reduce the amount of material needed to manufacture the packaging cushion 110.

It should be noted that the translated top cushion piece does not have to be solid and can have hollow or void features. Exemplary translated top cushion pieces could be different sizes and could have void spaces in the middle. Turning to FIGS. 6A-6D, in exemplary embodiments the translated top cushion piece 222 may have a void space 252 defined therein. An exemplary packaging cushion 210 has a bottom cushion piece 212 defining a void cavity 224, first and second side cushion pieces 214, 216 defining access spaces 240, a front cushion piece 218 defining an entry space 232, a rear cushion piece 220, and a translated top cushion piece 222 extending from the rear cushion piece 220. The top cushion piece 222 is displaced from the void cavity 224 and from the bottom cushion piece 212 and extends parallel to, or at any angle to, the void cavity 224 and the bottom cushion piece 212.

The bottom cushion piece 212 defines a void cavity 224 that corresponds in size and shape to the size and shape of the translated top cushion piece 222. In exemplary embodiments, the void cavity 224 and the translated top cushion piece 222 are substantially rectangular. A substantially rectangular void space 252 is defined in the translated top cushion piece 222. The void space 252 is substantially the same shape as the translated top cushion piece 222 but smaller such that the edges of the translated top cushion piece 222 form a rectangular ring around the void space 252. This structure of the translated top cushion piece 222 advantageously provides protection for the product being shipped while allowing the user to see a substantial portion of the product housed in the packaging cushion and reducing the amount of packaging material needed.

In operation, the user inserts the electronic device or other product 5 to be shipped into the packaging cushion 10, 110, 210 by sliding the product 5 through the entry space 32, 132, 232 in the front cushion piece 18, 118, 218 of the packaging cushion. This process is illustrated in FIGS. 7A-7C, 8A-8C, 9 and 10. The user than continues to slide the product 5 over the front entry portion 26, 126, 226 of the bottom cushion piece 12, 112, 212 until it is disposed in the packaging cushion 10, 110, 210. If helpful, the user can utilize access spaces 40, 140, 240 and/or bottom access spaces 250 to make insertion of the electronic device 5 into the packaging cushion 10, 110, 210 easier. More particularly, when fully disposed in the packaging cushion 10, 110, 210, the electronic device 5 rests on the bottom cushion piece 12, 112, 212, covering the void cavity 24, 124, 224.

Figure 8A:
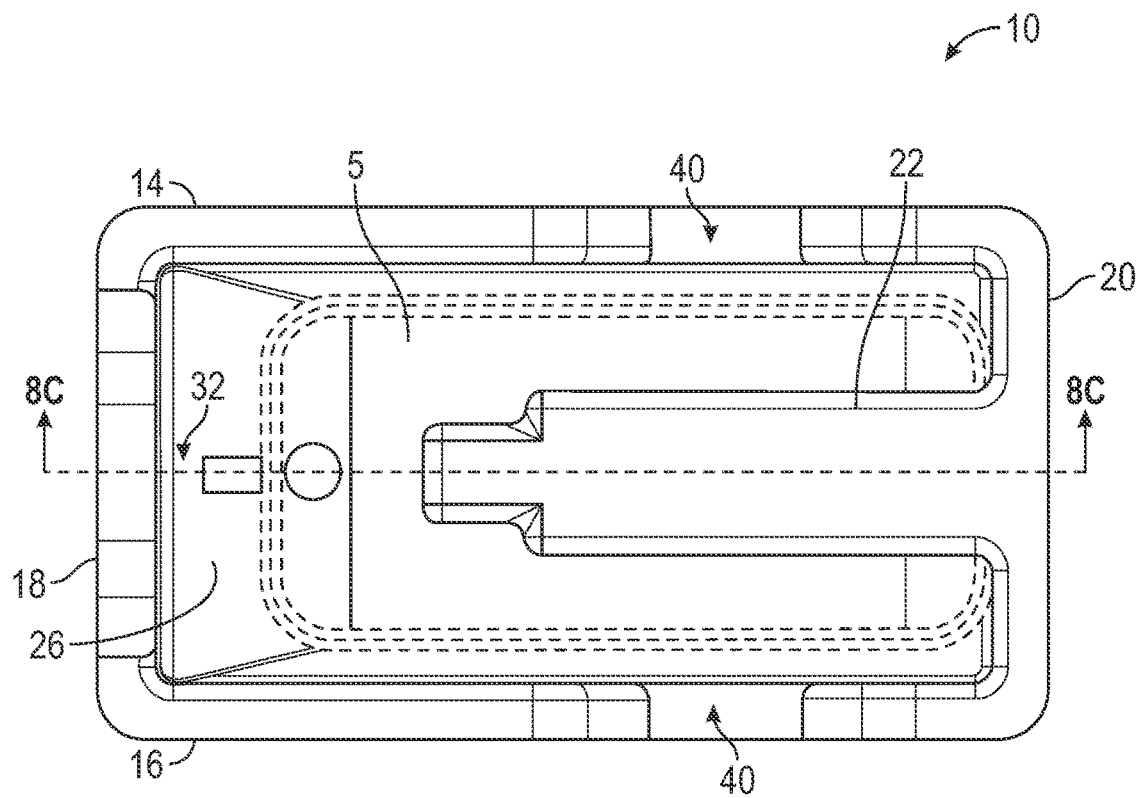
FIG. 8A is a top view of an exemplary embodiment of a packaging cushion in accordance with the present disclosure containing an electronic device or other product to be shipped.
Figure 8B:
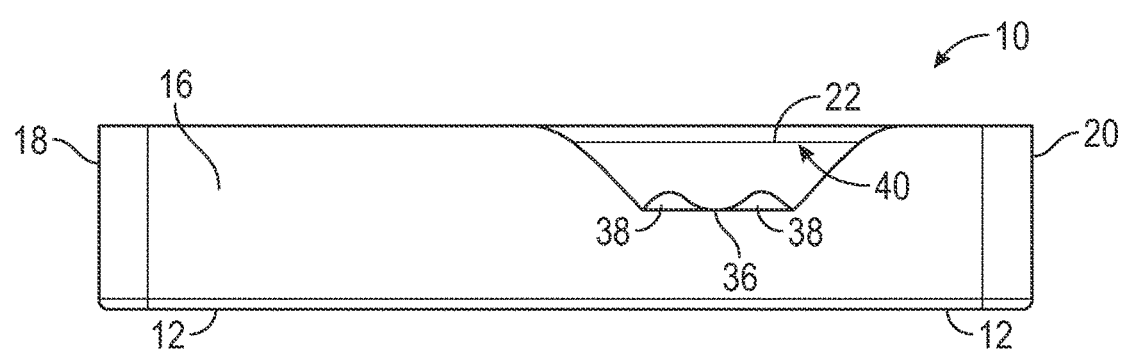
FIG. 8B is a side view of the packaging cushion of FIG. 8A.
Figure 8C:
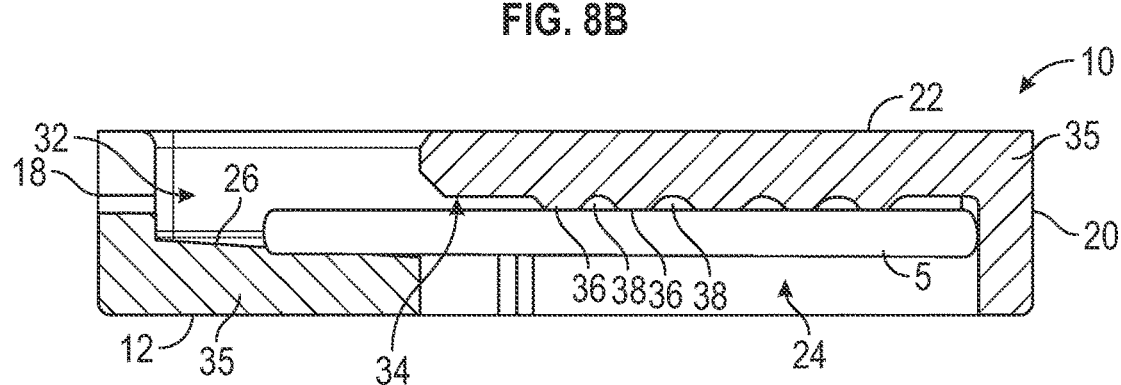
FIG. 8C is a side cross-sectional view of the packaging cushion of FIG. 8A.
Figure 9:
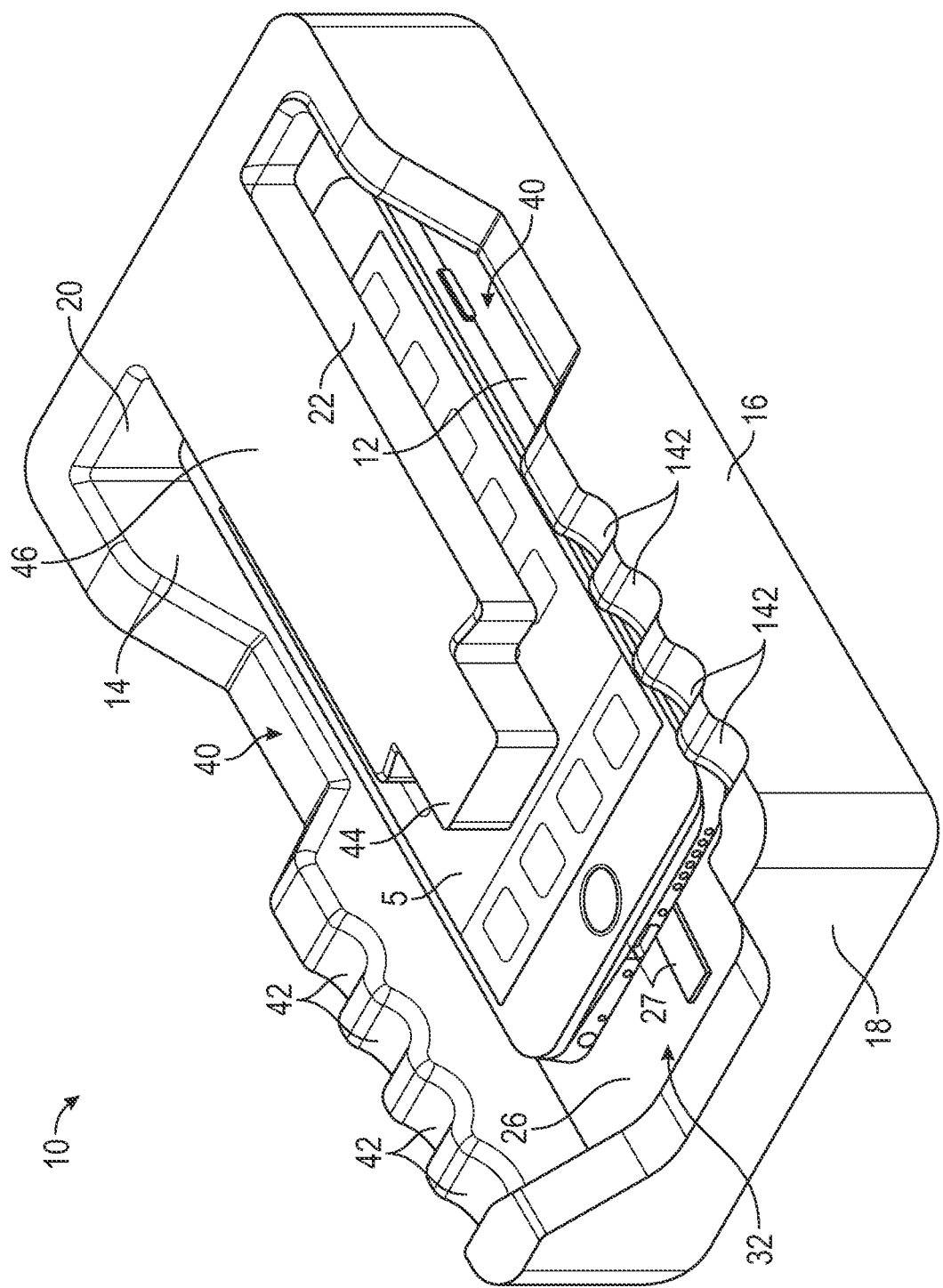
FIG. 9 is a perspective view of an exemplary embodiment of a packaging cushion in accordance with the present disclosure containing an electronic device or other product to be shipped.
Figure 10:
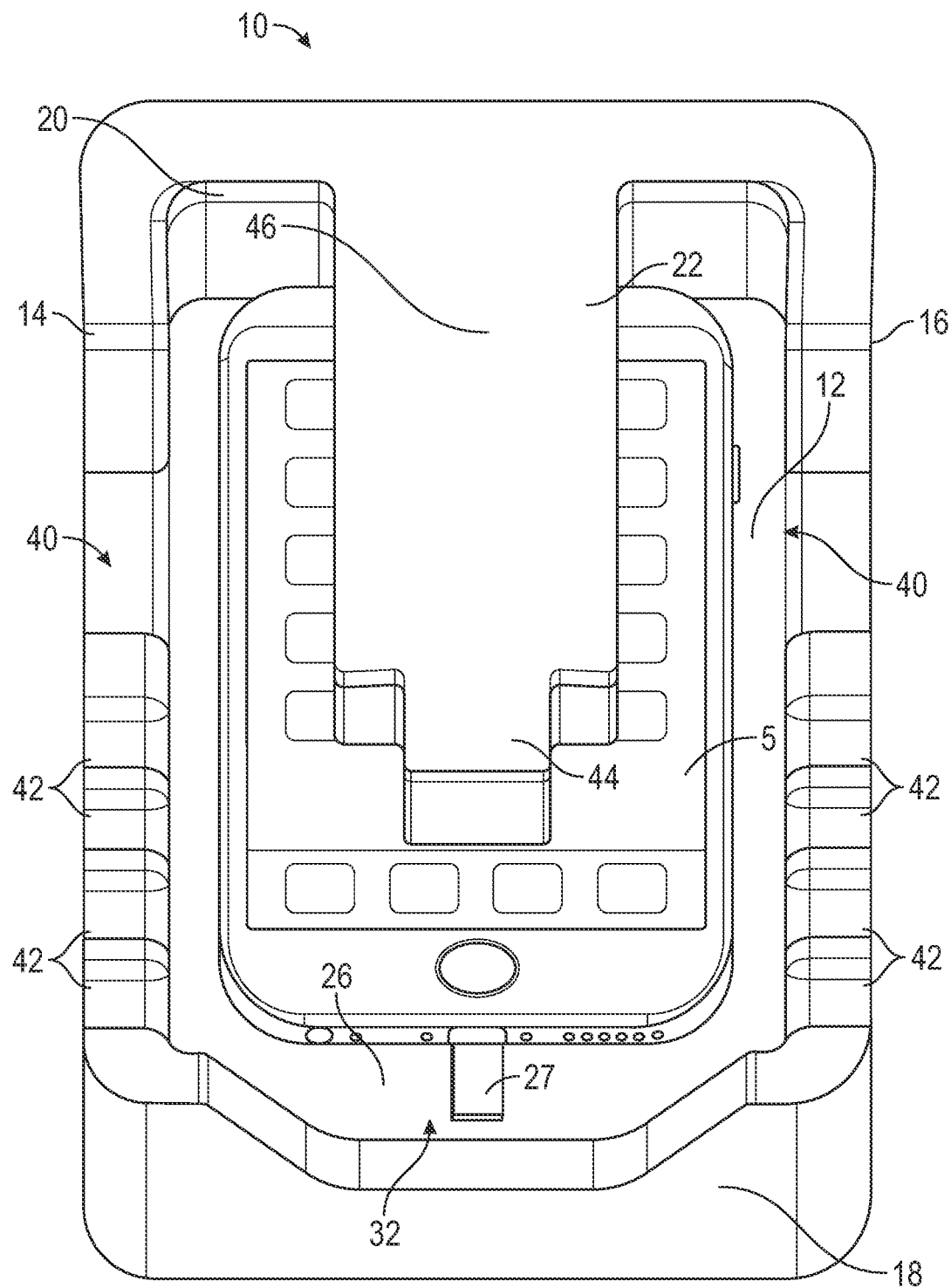
FIG. 10 is a perspective view of an exemplary embodiment of a packaging cushion in accordance with the present disclosure containing an electronic device or other product to be shipped.
Figure 11C:
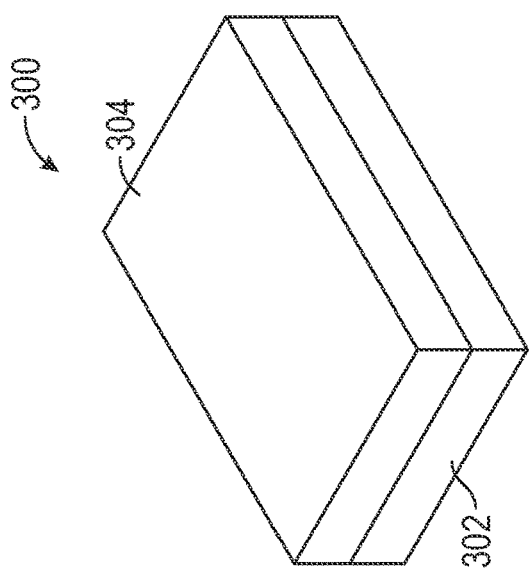
FIG. 11C is a perspective view of the mold of FIG. 11A.
Figure 11D:
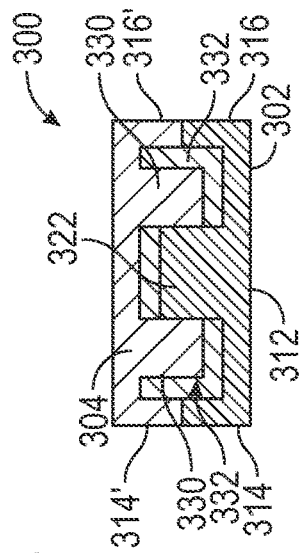
FIG. 11D is a front cross-sectional view of the mold of FIG. 11A.
Figure 11B:
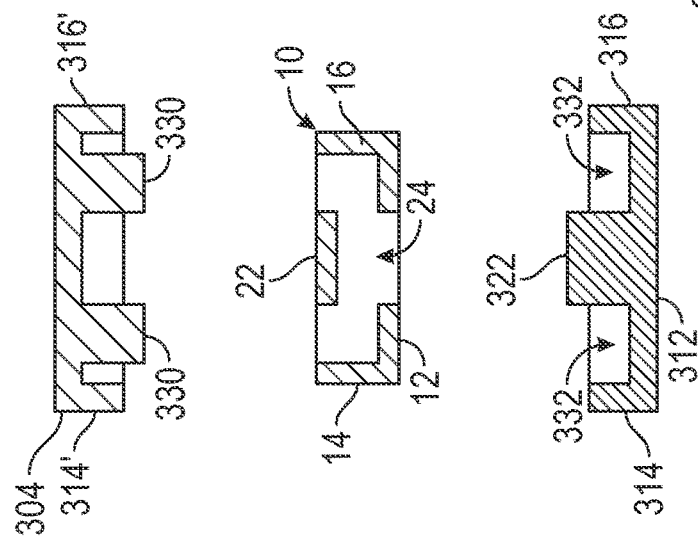
FIG. 11B is a front cross-sectional view of the mold of FIG. 11A.
Figure 11A:
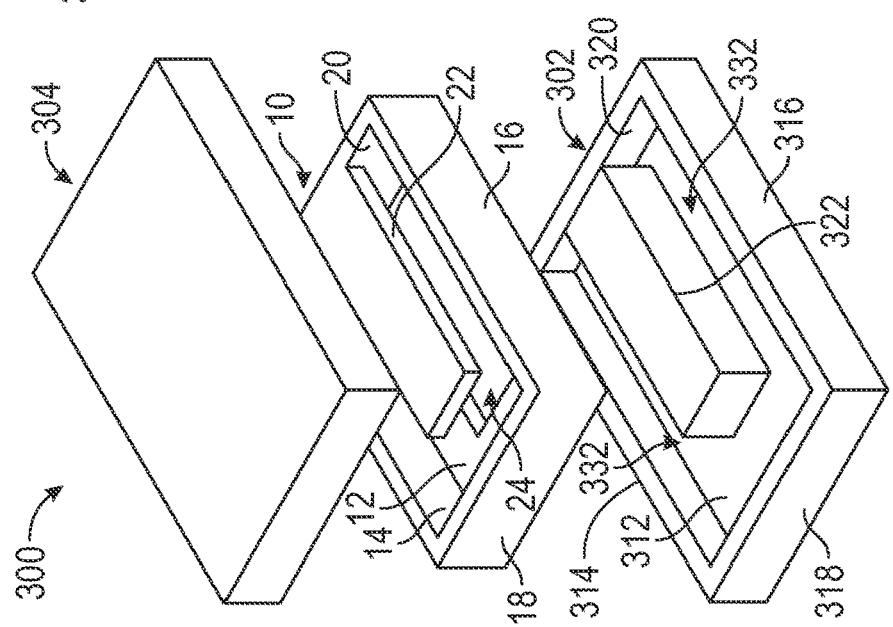
FIG. 11A is an exploded view of an exemplary embodiment of a mold used to manufacture exemplary embodiments of packaging cushions in accordance with the present disclosure.

As shown in FIGS. 8A-8C, 9 and 10, the packaging cushion 10 encapsulates the product 5, illustrated here as a cell phone, by at least partially covering its six sides. More particularly, the back surface of the electronic device 5 is at least partially covered by the bottom cushion piece 12, 112, 212, the two lateral sides of the electronic device are at least partially covered by the first and second side cushion pieces 14, 114, 214, 16, 116, 216, respectively, the top and bottom ends of the electronic device are at least partially covered by the rear cushion piece 20, 120, 220 and front cushion piece 18, 118, 218, respectively, and the front surface of the electronic device is at least partially covered by the translated top cushion piece 22, 122, 222. The product 5 is secured in the packaging cushion 10, 110, 210, by the variable compression surface 34, 134, which compresses to hold the product in place. As best seen in FIG. 8C, additional securing of the product could be provided by compression from a variable compression material 35 on or within the bottom cushion piece 12, the translated top cushion piece 22, the front cushion piece 18, and the rear cushion piece 20.

Upon arrival at its destination, the person receiving the product 5 can remove it from the packaging cushion by sliding it out over the over the front entry portion 26, 126, 226 of the bottom cushion piece 12, 112, 212 and through the entry space 32, 132, 232 in the front cushion piece 18, 118, 218 of the packaging cushion. If helpful, the person removing the product 5 can utilize access spaces 40, 140, 240 and/or bottom access spaces 250 to make removal from the packaging cushion 10, 110, 210 easier.

Referring to FIGS. 11A-11D, exemplary methods of manufacturing packaging cushions will now be described. In general, exemplary manufacturing methods utilize a male mold 302 located on the bottom and a female mold 304 at the top. Depending on the cushion design, the male and female molds could be oppositely configured. The male mold 302 extends up past the female mold 304 thus creating the void cavity 24 and the translated top cushion piece 22. More particularly, the raised or translated top cushion piece 22 is formed by raising the male mold 302 into the inner depth of the female mold 304 or with a mold where the female mold 304 is raised past the inner depth of the male mold 302 thus creating the void cavity 24 of the finished cushion 10. Alternatively, the translated top cushion piece 22 is formed by raising the female mold into an inner depth of the male mold. In exemplary embodiments, the packaging cushion 10 is made of a moldable foam material.

Exemplary methods of manufacturing a one-piece encapsulating packaging cushion comprise forming a bottom cushion piece 12, forming a void cavity 24 in the bottom cushion piece 12, and forming a translated top cushion piece 22. The bottom surface 332 of the male mold 302 forms the bottom cushion piece 12. In exemplary embodiments, the translated top cushion piece 22 is formed parallel to and displaced from the void cavity 24. This is done by using a male mold 302 that has a raised central surface 322 and a female mold 304 that has two spaced raised lateral surfaces 330. The raised central surface 322 of the male mold 302 forms the void cavity 24 in the bottom surface 12 of the packaging cushion 10 and facilitates formation of the translated top cushion piece 22 of the packaging cushion 10. The spaced raised lateral surfaces 330 of the female mold 304 define a central portion that helps with formation of translated top cushion piece 22. In exemplary embodiments, the manufacturer would create a variable compression contact surface on the translated top cushion piece 22 or make the translated top cushion piece 22 out of a variable compression material.

The manufacturer uses the male mold 302 and female mold 304 to form the first side cushion piece 14 and the second side cushion piece 16 substantially perpendicular to or at another desired angle to the bottom cushion piece 12 and opposite the first side cushion piece 14. The first and second side cushion pieces 14 and 16 are formed by the mating of the first and second side walls 314, 316 of the male mold 302 with the first and second side walls 314', 316' of the female mold 304. More particularly, the first and second side cushion pieces 14 and 16 are formed in the spaces created between the first and second side walls 314', 316' and the spaced raised lateral surfaces 330 of the female mold 304. The manufacturer also forms the front cushion piece 18 substantially perpendicular to or at another desired angle to the bottom cushion piece 12 using the front wall 318 of the male mold 302 mated with the female mold 304. Similarly, the rear cushion piece 20 is formed substantially perpendicular to or at another desired angle to the bottom cushion piece 12 and opposite the front cushion piece 18 using the rear wall 320 of the male mold 302 mated with the female mold 304. The structure of the rear wall 320 and the raised central surface 322 of the male mold 302 results in the translated top cushion piece 22 extending from the rear cushion piece 20 of the packaging cushion 10.

The male and female molds could be structured to form additional features such as a front entry portion 26 in the bottom cushion piece 12, an entry space 32 in the front cushion piece 18, access spaces 40, 140, 240 and/or bottom access spaces 250, one or more grooves 42 in the first side cushion piece 14 and/or the second side cushion piece 16. Alternatively, one or more of these additional features could be created later in the process by machining or other methods.

Packaging cushions and methods described herein can be used for a wide variety of products and applications in a wide variety of industries. For example, they could be used for consumer electronics, for which the reduced costs, increased protection level, reusability, recyclability, and potential biodegradability would be advantageous. In medical packaging applications, the cleanliness, efficiency, and reusability would be particularly advantageous. For retail packaging, the reduced costs, would be advantageous. The cushions' scalability, reduced costs, and reusability would be particularly advantageous for industrial uses. In the automotive industry, the reduced costs, reusability, and scalability would be advantageous. For shipping glass, the reduced costs, better protection level, and reusability would be particularly advantageous. For safety equipment, the cushions' higher degree of impact protection, edge and corner protection, and personal impact protection would be advantageous.

Thus, it is seen that packaging cushions and related methods are provided. It should be understood that any of the foregoing configurations and specialized components or may be interchangeably used with any of the apparatus or systems of the preceding embodiments. Although illustrative embodiments are described hereinabove, it will be evident to one skilled in the art that various changes and modifications may be made therein without departing from the scope of the disclosure. It is intended in the appended claims to cover all such changes and modifications that fall within the true spirit and scope of the disclosure.

What is claimed is:

1. A unitary, one-piece packaging cushion comprising:
    a bottom cushion piece defining a void cavity and an entry portion, the void cavity having a first size and a first shape;
    a first side cushion piece wholly integrated with and substantially perpendicular to the bottom cushion piece and a second side cushion piece substantially perpendicular to the bottom cushion piece and opposite the first side cushion piece;
    a front cushion piece wholly integrated with and substantially perpendicular to the bottom cushion piece and defining an entry space adjacent to the entry portion;
    a rear cushion piece wholly integrated with and substantially perpendicular to the bottom cushion piece and opposite the front cushion piece; and
    a translated top cushion piece wholly integrated with and extending from the rear cushion piece and displaced from the void cavity, the translated top cushion piece being solid and having a second size and a second shape substantially the same as the first size and the first shape of the void cavity when wholly integrated with and extending from the rear cushion piece over the void cavity.

2. The packaging cushion of claim 1 wherein the size and shape of the void cavity corresponds to the size and shape of the translated top cushion piece.

3. The packaging cushion of claim 1 wherein the translated top cushion piece comprises a variable compression contact surface.

4. The packaging cushion of claim 1 wherein at least part of one or more of the group consisting of the bottom cushion piece, the translated top cushion piece, and the rear cushion piece is made of a variable compression material.

5. The packaging cushion of claim 1 wherein the packaging cushion at least partially covers six sides of a product housed therein.

6. The packaging cushion of claim 1 wherein one or both of the first and second side cushion pieces defines an access space.

7. The packaging cushion of claim 1 wherein the bottom cushion piece defines one or more access spaces.

8. The packaging cushion of claim 1 wherein one or both of the first and second side cushion pieces defines one or more grooves.

9. The packaging cushion of claim 1 wherein the translated top cushion piece defines a void space.

10. A packaging cushion comprising:
a bottom cushion piece defining a void cavity and an entry portion, the void cavity having a first size and a first shape;
a first side cushion piece substantially perpendicular to the bottom cushion piece and a second side cushion piece substantially perpendicular to the bottom cushion piece and opposite the first side cushion piece;
a front cushion piece substantially perpendicular to the bottom cushion piece and defining an entry space adjacent to the entry portion;
a rear cushion piece substantially perpendicular to the bottom cushion piece and opposite the front cushion piece; and
a translated top cushion piece extending from the rear cushion piece and displaced from the void cavity, the translated top cushion piece being solid and having a second size and a second shape substantially the same as the first size and the first shape of the void cavity.

* * * * *